(12) United States Patent
Hansen et al.

(10) Patent No.: US 6,578,912 B2
(45) Date of Patent: Jun. 17, 2003

(54) SEAT MODULE ELECTRIFICATION SYSTEM

(75) Inventors: Scott A. Hansen, Holland, MI (US);
Keith A. Bonnes, Holland, MI (US);
Nels R. Smith, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 89 days.

(21) Appl. No.: 09/832,241

(22) Filed: Apr. 10, 2001

(65) Prior Publication Data
US 2002/0145317 A1 Oct. 10, 2002

(51) Int. Cl.[7] .................................................. A47C 7/72
(52) U.S. Cl. .............................. 297/217.3; 297/188.04
(58) Field of Search ........................ 297/217.3, 188.04; 455/3.06, 41; 439/247, 289, 381

(56) References Cited

U.S. PATENT DOCUMENTS

| | | | |
|---|---|---|---|
| 3,019,050 A | * | 1/1962 | Spielman .................. 297/217.3 |
| 4,763,360 A | | 8/1988 | Daniels et al. |
| 5,696,409 A | | 12/1997 | Handman et al. |
| 5,752,845 A | | 5/1998 | Fu |
| 5,947,541 A | | 9/1999 | Behrens et al. |
| 6,050,835 A | * | 4/2000 | Henrion et al. .......... 297/217.3 |
| 6,062,644 A | * | 5/2000 | Lance ......................... 297/410 |
| 6,199,948 B1 | | 3/2001 | Bush et al. ............... 297/217.3 |
| 6,250,703 B1 | | 6/2001 | Cisler et al. |
| 6,257,641 B1 | | 7/2001 | Fritz et al. |
| 6,279,981 B1 | * | 8/2001 | Mesnage ................. 297/217.3 |
| 6,343,939 B1 | | 2/2002 | Inoue |
| 6,361,113 B2 | * | 3/2002 | Heilig ......................... 297/410 |
| 6,402,240 B1 | * | 6/2002 | Toba et al. ............... 297/217.3 |
| 6,406,334 B2 | * | 6/2002 | Chu ......................... 297/217.3 |
| 6,485,080 B2 | | 11/2002 | Hansen et al. |

FOREIGN PATENT DOCUMENTS

FR 2 753 940 9/1996

* cited by examiner

Primary Examiner—Peter R. Brown
(74) Attorney, Agent, or Firm—Foley & Lardner

(57) ABSTRACT

A seat module electrification system includes electrical contacts on the seat and electrical contacts on the module. In the preferred and illustrated embodiment the electrical terminals on the seat comprise conductive strips located proximate a pocket adapted to receive the module and the electrical terminals on the module comprise formed terminals having a conductive tip, the module terminals being arranged to engage the strips when the module is placed in the pocket. The module may be attached to the pocket in a variety of ways including a mechanical latch system or other fasteners. In one illustrated form of the invention, a switch is provided so that power does not pass to the strips unless the module is attached to the seat.

14 Claims, 4 Drawing Sheets

SEAT MODULE ELECTRIFICATION SYSTEM

BACKGROUND OF THE INVENTION

1. Field of the Invention

The present invention relates generally to the field of vehicle seating and more particularly to the electrification of modules which may be attached to a seat. In its most preferred form the present invention relates to a seat module electrification system which automatically provides power to the module when the module is coupled to the seat.

2. Description of the Prior Art

A variety of module products are known or are being developed for use in motor vehicles, including educational and entertainment modules, cooler modules or other modules for use in an outdoor camping or sporting event environment, modules which may be used for additional lighting, for supplying computer power, and the like. Some of these modules require power which heretofore has been supplied by self contained power devices within the module or by hand coupling the module to the vehicles power system using cigarette lighter adapters, plugs, etc. As the variety of powered seat modules increases, a need exists for a module electrification system which is easy to use, inexpensive to manufacture and which provides power to the module whenever the module is properly installed in the seat.

An illustrative example of a module with which the present invention is concerned is an electrified module which may be attached to a pocket in the back of a vehicle seat and which may be detached for use away from the vehicle. The development of an electrification system for such modules meeting the above identified requirements would result in a significant advance in this art.

FEATURES AND SUMMARY OF THE INVENTION

The present invention features a removable seat module electrification system which automatically provides power to a module when the module is properly installed in the seat.

Another feature of the present invention is a seat module electrification system in which the electrical terminals can be adapted to a wide variety of seat modules and seat module attachment locations.

A different feature of the present invention is to provide a seat module electrification system in which power is provided to the module only when the module is installed properly.

A further feature of the present invention is to provide a seat module electrification system which includes electrical contacts not active unless the seat module is installed properly.

Yet a further feature of the present invention is to provide a seat module electrification system in which the module may be held in the seat using any of a variety of known techniques including the use of latches, fasteners or other attachment systems.

How the foregoing and other features of the invention are accomplished, individually or in any combination, will be described in the following detailed descriptions of the preferred embodiment taken in conjunction with the figures. Generally, however, the features are provided by a seat module electrification system which includes electrically conductive terminals on or in the vicinity of a pocket adapted to receive the module. Terminals on the module are arranged to engage the seat terminals when the module is properly installed. In the most preferred and illustrated embodiment, a switch is provided for one of a pair of vehicle contact strips, so that electricity will not flow unless the seat module is installed, thereby preventing accidental shorting of the system. In the preferred embodiment, the vehicle electrical contacts are conductive strips and the module electrical contacts are conductive terminals having a contact tip adapted to engage the strips when the module is installed. Other ways in which the features of the present invention are accomplished will become apparent to those skilled in the art after they have read the following description. Such other ways are also deemed to fall within the scope of the present invention, if they fall within the scope of the claims which follow.

DESCRIPTION OF THE FIGURES

In the following FIGURES, like reference numerals are used for like components.

DESCRIPTION OF THE PREFERRED AND ALTERNATE EMBODIMENTS

Before beginning the description of the preferred and alternate embodiments, several general comments can be made about the applicability and the scope of the present invention.

First, the particular type of module to receive electricity according to the present invention is not, in and of itself, part of the present invention. The invention is illustrated below in connection with a rectangular module adapted to fit within a rectangular pocket in the back of a seat. Any type of module requiring electricity can be employed, including either use-in-place, fold down or removable modules, intended for use in lighting, communications, computing, entertainment, refrigeration, educational, and other uses.

Second, a mechanical system is shown for attaching the module to the seat, namely a latch system. However, other mechanical systems can be employed, such as systems employing rods and sockets or hinges. Alternatively, attachment can be provided by friction fit of the module within the pocket, or any of a variety of fasteners can be employed, either to hold the module within the pocket or to keep the module in a particular position if another seat/module attachment technique is used. Suitable fasteners include zippers, snap fasteners, latches and Velcro®.

Third, while the particular illustrated seat and module have a rectangular configuration, the shape of the module can also be widely varied. For example, a relatively narrow rectangular module having its long sides parallel to the vehicle floor could be employed. Square modules or modules having one or more curved sides can also be employed using the basic principles of this invention.

Fourth, a particularly preferred form of electrical contacts for use with the seat and with the module are illustrated and described below. While they are preferred, the type of electrical contacts can be varied without departing from the invention's intended scope. Furthermore, the contact material can be selected from those currently used in motor vehicle electrical systems, including metals, metal alloys, or conductive plastics.

Figures 1, 1A:
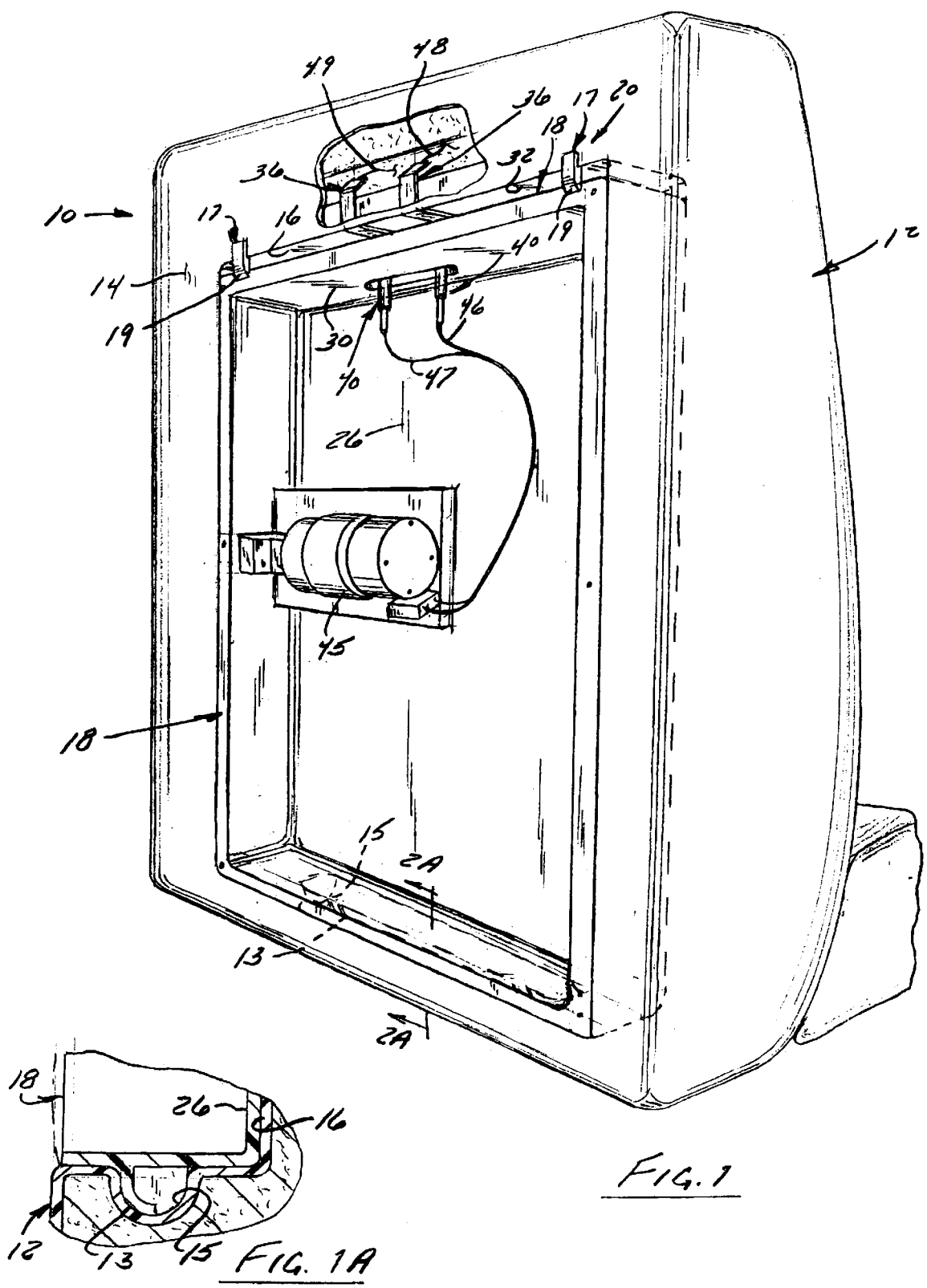
FIG. 1 is a perspective, schematic view of a seat module electrification system with parts of the seat and module being removed for greater clarity of explanation.

Proceeding now to the description of the preferred embodiment, FIG. 1 is a perspective view of the principal components of a seat module electrification system 10. Only the back portion 14 of a vehicle seat 12 is shown in this view as the seat does not, in and of itself, form part of the present invention. Back portion 14 includes a pocket 16 adapted to receive a module 18. The rear external wall of module 18 has been removed to illustrate relevant internal components.

In preferred system 10, module 18 is coupled to seat 12 using a socket and latch system 20. The module includes a pair of protrusions 13 on its lower edge adapted to be received in sockets 15. At the upper end of module 18, spring loaded plunger release mechanisms 17 having includes a latch tongue 19 are arranged to hold the module 18 in pocket 16.

Figure 2:
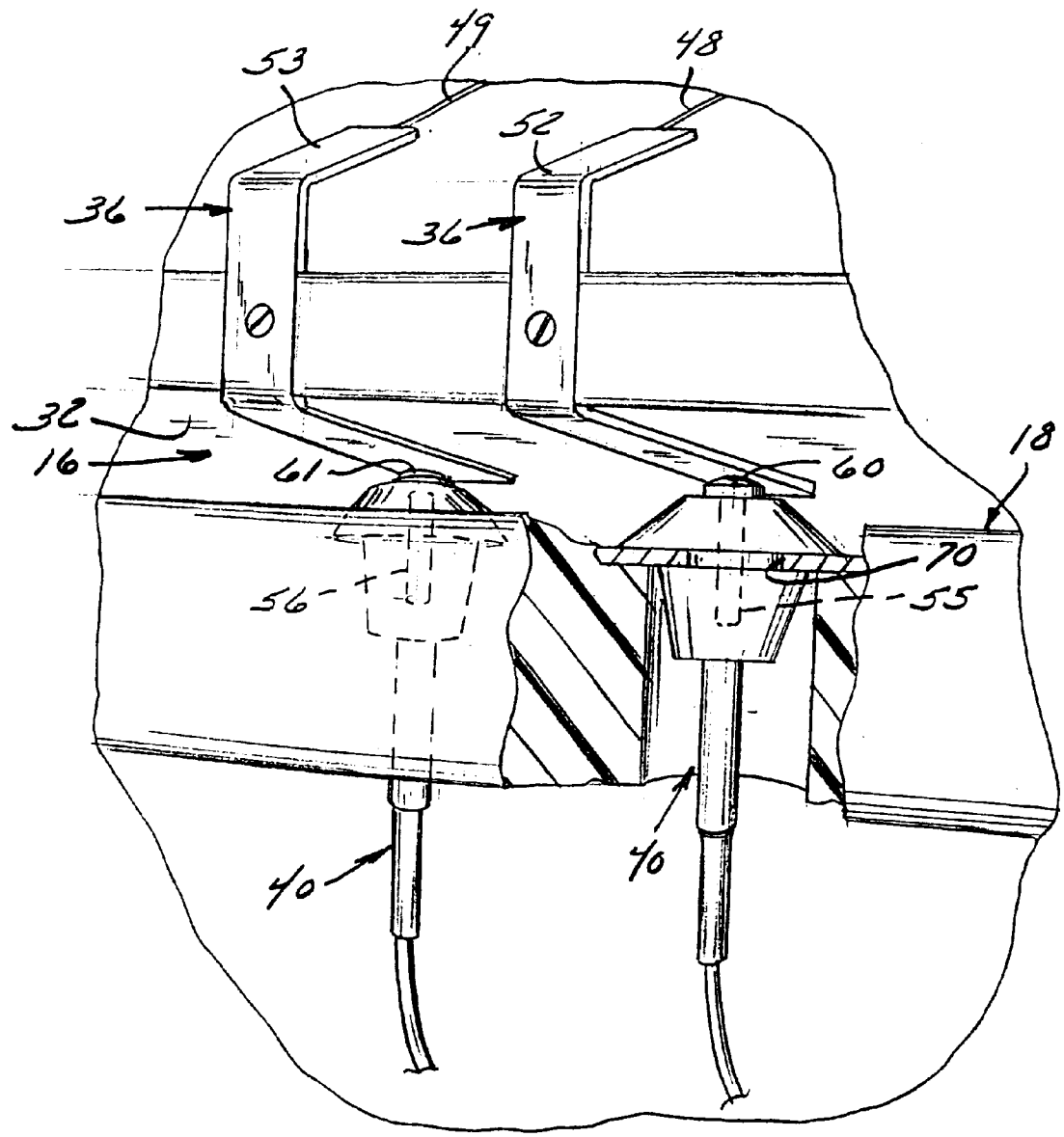
FIG. 2 is an enlarged view of the electrical contact area of the system shown in FIG. 1.

The seat module electrification system further includes electrical terminals 36 and 40 located respectively on the seat 12 and on module 18, and as shown in FIGS. 1 and 2, the terminals 36 and 40 are in engagement with one another when module 18 is installed. It will also be apparent from these FIGURES that the module 18 will receive power only when it is installed, because removal of module 18 will disengage the terminals 36 from terminals 40.

Terminals 40 are connected to an electrical device requiring power by wires 46, 47 within module 18, and terminals 36 are coupled to the vehicle's power source by wires 48, 49. Power in turn is provided to seat 12 by hard wiring the seat 12, by plugging the seat 12 into a vehicle power supply plug (not shown) as is presently done for removable van and SUV seats or in any other suitable way. What is required is that power, however delivered, exist at terminals 36 for transmission to module 18 when it is installed. In most cases, the power will be 12V DC, but may be up to 50V DC.

The enlarged view of the engaged terminals 36 and 40 provided in FIG. 2, show that the preferred terminals 36 are a pair of spaced apart electrically conductive strips 52, 53 which are suitably embedded in the seat so that outer surfaces therefore are exposed. The terminals 40, on the other hand are a pair of formed terminals 55, formed terminals 56 having enlarged tips 60, 61, the components of contacts 40 being mounted in module 18 to create the desired electrical pathway when the module is installed.

Figure 3:
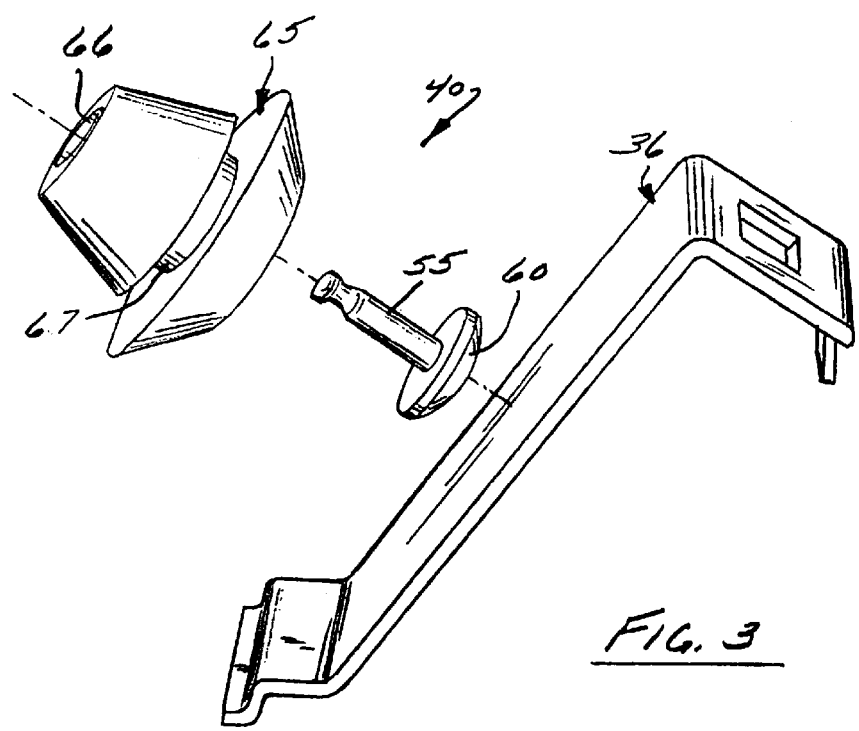
FIG. 3 is an exploded perspective view showing the preferred electrical contacts.
Figure 4:
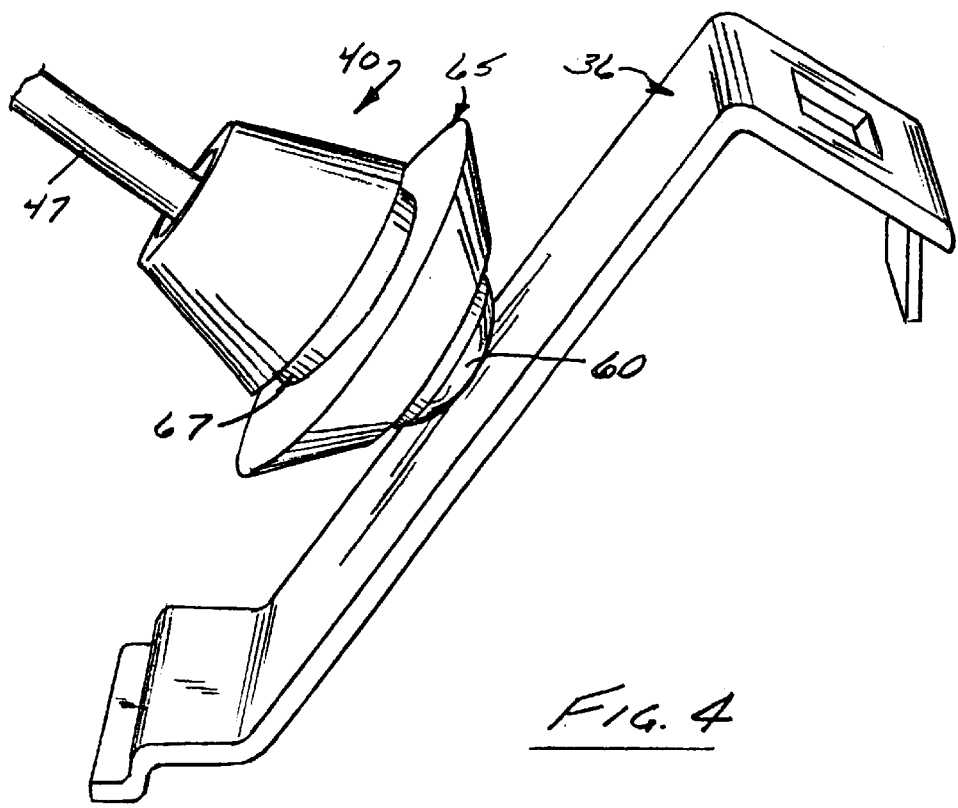
FIG. 4 is a perspective view of the assembled electrical contacts shown in FIG. 3.

FIGS. 3 and 4 illustrate, in exploded form and in combination, one set of the aforementioned strips 52, terminals 55 with tip 60. It is also seen in these FIGURES that an elastomeric grommet 65 surrounds the area of terminal 55, adjacent to the tip 60, each grommet 65 including an axial hole 66 and a circumferential groove 67 adapted to allow the grommet 65 to be snapped into an opening 70 (see FIG. 2) in the module 18. This arrangement will allow the terminal 55 to move longitudinally against the elastomeric forces of grommet 65 as the module 18 is installed to attach it to seat 12 and create the engagement of terminals 36 and 40. In addition to ensuring electrical contact, the slight movement of the terminal 40 against the compressive force existing between the grommet 65 and the strips 52, 53 will cause a wiping action, (i.e. a self-cleaning) of tips 60, 61 each time the module 18 is pivoted and reinstalled.

From the foregoing description it will be appreciated that strips 52, 53 are live when the vehicle ignition is on, and while 12V DC power is substantially harmless to humans, the possibility does exist for shorting out the power system (requiring a fuse replacement) if, for example, a conductive item such as a wrench or other tool was to simultaneously contact strips 52 and 53. Some vehicle buyers also believe that all exposed electrical contacts pose a hazard, so, the preferred embodiment of the present invention includes a switch to activate power to the module 18 only when the module 18 is in place.

Figure 5:
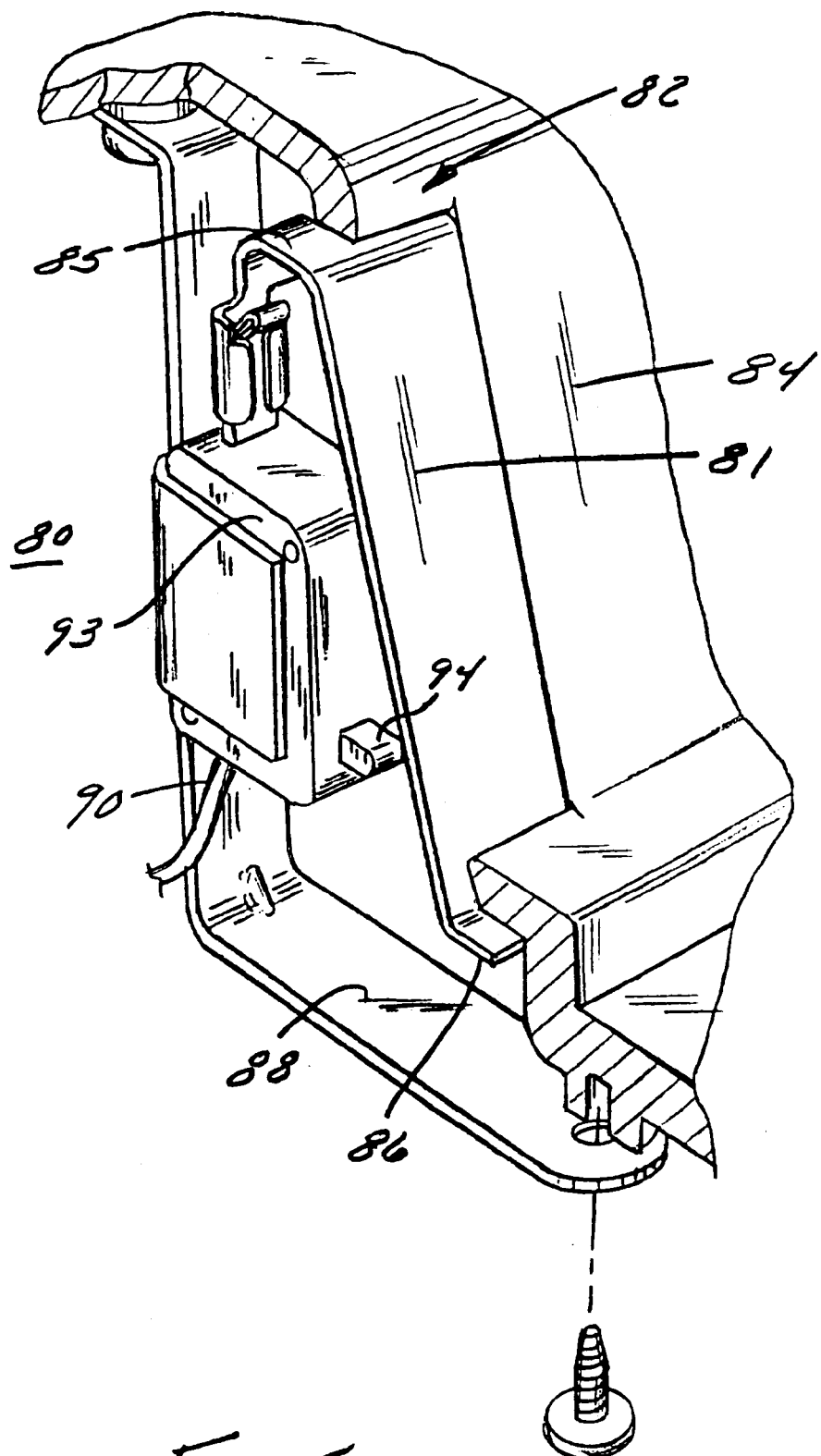
FIG. 5 is a perspective view, with parts broken away showing a switch and conductive strip arrangement according to the preferred embodiment of the invention.

FIG. 5 illustrates a preferred switch arrangement 80, wherein a conductive strip 81 (ground or active) is embedded in an edge 82 of a pocket 16 in a seat 12 in such a manner that an upper end 85 of the strip 81 is fixed, while the lower end 86 is free to move inwardly when pressure is applied thereto. This is accomplished using an L-shaped bracket 88 within the pocket 16. A wire 90 enters the vicinity of the bracket 88 and is electrically coupled to one terminal of a switch 93. A button 94 is located at the lower end of switch 93 and is arranged to touch strip 81 when the latter is pressed inwardly. When the button 94 is depressed, the switch 93 allows current to flow from wire 90, through switch 93 to strip 81.

In this preferred embodiment a module received in the pocket 16 will "turn on" the power to the module, while removal of the module, or displacement of that portion of the module engaging strip 81 will "turn off" the power and prevent inadvertent shorting of the circuit and the consequent need to replace a fuse. While 12V DC power is substantially harmless to humans, operators are comforted by the knowledge that they can touch the contact strip 81, when the module is removed, without fear of being shocked.

Furthermore, other types of contact switches can be used or remotely activated switches (e.g., a switch located on the vehicle instrument panel, console, door, remote keyless entry device, etc.) may be used in place of the illustrated switch arrangement. These would be activated at the discretion of the vehicle by the operator, and an indicator (for example a r.f. transmitter) can be coupled to the seat module electrification system to alert the operator whether a module is powered or not.

So while the present invention is described in connection with the foregoing preferred and an alternative embodiment, the invention is not to be limited in terms of dimensions, locations, materials, or other factors, but is to be limited solely by the scope of the claims which follow.

What is claimed is:

1. A module electrification system for a vehicle seat comprising:
    a vehicle seat adapted to be coupled to a module;
    a module for being attached to the seat;
    wires within the seat and electrical terminals on the exterior of the seat and proximate the location on the seat where the module is attached; and
    terminals on the module arranged for engagement with the seat terminals when the module is attached to the seat;
    wherein the electrical terminals on the exterior of the seat or the terminals on the module have an enlarged tip and an elastomeric, non-conductive material surrounding an area adjacent the tips whereby the tips yield under longitudinal force.

2. The electrification system of claim 1, wherein the seat includes a back having a pocket and the module is arranged to fit within the pocket.

3. The electrification system of claim 2, wherein the seat terminals are located within a periphery of the pocket and the module terminals are located on a periphery of the module.

4. The electrification system of claim 1, wherein a switch is provided on a seat terminal, the switch having an open position and a closed position, electricity flowing through the terminals only when the switch is in a closed position.

5. The electrification system of claim 4, wherein the switch is moved from the open to the closed position when the module is attached to the seat.

6. The electrification system of claim 1, wherein the module is selected from the group consisting of computer, educational, entertainment, refrigeration, illumination, and communications modules.

7. An electrification system for a vehicle seat module comprising:
 a vehicle seat having a pocket formed therein;
 a module sized and arranged for being located in the pocket;
 electrical terminals on the pocket and on the module adapted to engage one another and supply electricity to the module when the module is located in the pocket, wherein the pocket terminals are strips of conductive material and the module terminals are formed from a conductive material and have a tip and wherein a portion of the terminals adjacent the tips is surrounded by a non-conductive, elastomeric material and the terminals are mounted so that the tips yield under longitudinal force when they are in engagement with the strips.

8. The electrification system of claim 7, wherein the pocket and module are generally rectangular.

9. The electrification system of claim 8 herein the conductive material is selected from the group consisting of conductive metals, conductive metal alloys and conductive plastics.

10. The electrification system for claim 7, wherein a switch is provided on one of the pocket terminals, the switch having an open position and a closed position, wherein electricity may only flow through the pocket terminals when the switch is in the closed position.

11. The electrification system of claim 10, wherein the switch is moved from the open to the closed position when the module is attached to the seat.

12. The electrification system of claim 7, wherein the module is selected from the group consisting of computer, educational, entertainment, refrigeration, illumination, and communications modules.

13. The electrification system of claim 7, wherein the module includes a latch and the pocket latch receptacle, and wherein the module is held in the pocket by the latch engaging the receptacle.

14. The electrification system of claim 13, wherein the pocket also includes a socket and the module includes a protrusion arranged to be received in the socket when the module is installed.

* * * * *